United States Patent
Mula et al.

(10) Patent No.: US 10,218,642 B2
(45) Date of Patent: Feb. 26, 2019

(54) SWITCH ARBITRATION BASED ON DISTINCT-FLOW COUNTS

(71) Applicant: Mellanox Technologies TLV Ltd., Raanana (IL)

(72) Inventors: Liron Mula, Ramat Gan (IL); Sagi Kuks, Ramat Gan (IL); George Elias, Tel Aviv (IL); Eyal Srebro, Yokneam Moshava (IL); Ofir Merdler, Tel Aviv (IL); Amiad Marelli, Herzliya (IL); Lion Levi, Yavne (IL); Oded Zemer, Tel Aviv (IL); Yoav Benros, Givataim (IL)

(73) Assignee: Mellanox Technologies TLV Ltd., Raanana (IL)

(*) Notice: Subject to any disclaimer, the term of this patent is extended or adjusted under 35 U.S.C. 154(b) by 0 days.

(21) Appl. No.: 15/469,643

(22) Filed: Mar. 27, 2017

(65) Prior Publication Data

US 2018/0278549 A1  Sep. 27, 2018

(51) Int. Cl.
| | |
|---|---|
| *H04L 12/935* | (2013.01) |
| *H04L 12/933* | (2013.01) |
| *H04L 12/937* | (2013.01) |
| *H04L 12/931* | (2013.01) |
| *H04L 12/861* | (2013.01) |

(52) U.S. Cl.
CPC ...... *H04L 49/3018* (2013.01); *H04L 49/1523* (2013.01); *H04L 49/254* (2013.01); *H04L 49/3072* (2013.01); *H04L 49/65* (2013.01); *H04L 49/90* (2013.01)

(58) Field of Classification Search
CPC .................................................. H04L 45/74
See application file for complete search history.

(56) References Cited

U.S. PATENT DOCUMENTS 5,689,508 A * 11/1997 Lyles ............... H04L 12/5601
370/391
6,229,812 B1  5/2001 Parruck et al.
(Continued)

OTHER PUBLICATIONS

Flajolet et al., "HyperLogLog: the analysis of a near-optimal cardinality estimation algorithm", Conference on Analysis of Algorithms (AofA'07), Juan des Pins, France, pp. 127-146, Jun. 17-22, 2007.

(Continued)

*Primary Examiner* — Parth Patel
(74) *Attorney, Agent, or Firm* — Kligler & Associates

(57) ABSTRACT

A network switch includes circuitry and multiple ports, including multiple input ports and at least one output port, configured to connect to a communication network. The circuitry includes multiple distinct-flow counters, which are each associated with a respective input port and with the output port, and which are configured to estimate respective distinct-flow counts of distinct data flows received via the respective input ports and destined to the output port. The circuitry is configured to store packets that are destined to the output port and were received via the multiple input ports in multiple queues, to determine a transmission schedule for the packets stored in the queues, based on the estimated distinct-flow counts, and to transmit the packets via the output port in accordance with the determined transmission schedule.

18 Claims, 3 Drawing Sheets

(56) References Cited

U.S. PATENT DOCUMENTS

| | | | |
|---|---|---|---|
| 6,650,640 B1 | 11/2003 | Muller et al. | |
| 6,937,561 B2 | 8/2005 | Chiussi et al. | |
| 7,013,419 B2* | 3/2006 | Kagan | G06F 13/1605 |
| | | | 714/749 |
| 7,023,866 B2 | 4/2006 | Giroux et al. | |
| 7,080,168 B2 | 7/2006 | Dasgupta et al. | |
| 7,433,953 B1* | 10/2008 | Kappler | H04L 47/10 |
| | | | 370/230 |
| 7,539,199 B2 | 5/2009 | Shrimali et al. | |
| 7,698,412 B2* | 4/2010 | Narsinh | H04L 12/4666 |
| | | | 370/230 |
| 7,805,535 B2* | 9/2010 | Narsinh | H04L 47/10 |
| | | | 370/230 |
| 8,045,563 B2* | 10/2011 | Lee | H04L 47/10 |
| | | | 370/395.41 |
| 8,111,649 B1* | 2/2012 | Agarwall | H04L 12/00 |
| | | | 370/328 |
| 8,209,429 B2* | 6/2012 | Jacobs | H04N 21/23432 |
| | | | 348/219.1 |
| 8,259,585 B1* | 9/2012 | S P | H04L 45/125 |
| | | | 370/237 |
| 8,274,988 B2* | 9/2012 | Rojas-Cessa | H04L 49/1515 |
| | | | 370/388 |
| 8,406,132 B2 | 3/2013 | Cao et al. | |
| 8,520,522 B1* | 8/2013 | Goldman | H04L 47/26 |
| | | | 370/235 |
| 8,627,472 B2 | 1/2014 | Kind et al. | |
| 8,848,529 B2* | 9/2014 | Voruganti | H04L 47/522 |
| | | | 370/232 |
| 9,083,655 B2* | 7/2015 | Matthews | H04L 45/74 |
| 9,325,641 B2* | 4/2016 | Haramaty | H04L 49/90 |
| 9,641,465 B1* | 5/2017 | Gabbay | H04L 49/90 |
| 9,648,081 B2* | 5/2017 | Raikin | G06F 12/1072 |
| 9,699,095 B2* | 7/2017 | Elias | H04L 47/2441 |
| 9,729,440 B2* | 8/2017 | Itkin | H04L 45/74 |
| 9,824,092 B2 | 11/2017 | Shamis et al. | |
| 9,832,143 B2* | 11/2017 | Srinivasan | H04L 49/3045 |
| 9,838,338 B2* | 12/2017 | Srinivasan | H04L 49/3054 |
| 9,934,010 B1* | 4/2018 | Griffin | G06F 9/48 |
| 2003/0165148 A1* | 9/2003 | Bishard | H04L 47/10 |
| | | | 370/412 |
| 2003/0219026 A1* | 11/2003 | Sun | H04L 47/20 |
| | | | 370/412 |
| 2005/0259578 A1* | 11/2005 | Shinagawa | H04L 47/10 |
| | | | 370/230 |
| 2005/0286434 A1* | 12/2005 | McKee | H04L 43/022 |
| | | | 370/252 |
| 2006/0028999 A1 | 2/2006 | Iakobashvili et al. | |
| 2006/0233177 A1* | 10/2006 | Basso | H04L 45/00 |
| | | | 370/395.4 |
| 2007/0104102 A1* | 5/2007 | Opsasnick | H04L 47/10 |
| | | | 370/230 |
| 2007/0121504 A1* | 5/2007 | Hellenthal | H04L 47/10 |
| | | | 370/230 |
| 2007/0127514 A1* | 6/2007 | Post | H04L 49/254 |
| | | | 370/422 |
| 2007/0153697 A1* | 7/2007 | Kwan | H04L 47/215 |
| | | | 370/235 |
| 2008/0063004 A1* | 3/2008 | Himberger | H04L 47/10 |
| | | | 370/413 |
| 2008/0240139 A1* | 10/2008 | Kodialam | H04L 47/564 |
| | | | 370/412 |
| 2009/0028046 A1* | 1/2009 | Kanda | H04L 43/026 |
| | | | 370/235 |
| 2009/0138577 A1 | 5/2009 | Casado et al. | |
| 2009/0287822 A1* | 11/2009 | Berdardi | H04L 47/10 |
| | | | 709/226 |
| 2010/0098104 A1* | 4/2010 | Marshall | H04L 49/254 |
| | | | 370/419 |
| 2010/0260198 A1* | 10/2010 | Rojas-Cessa | H04L 49/1515 |
| | | | 370/417 |
| 2011/0007687 A1* | 1/2011 | Howe | H04W 72/1242 |
| | | | 370/328 |
| 2011/0158248 A1* | 6/2011 | Vorunganti | H04L 47/12 |
| | | | 370/412 |
| 2012/0233349 A1* | 9/2012 | Aybay | H04L 47/2441 |
| | | | 709/234 |
| 2013/0044755 A1* | 2/2013 | Liu | H04L 47/568 |
| | | | 370/394 |
| 2013/0259052 A1 | 10/2013 | Akiyosh | |
| 2014/0032736 A1 | 1/2014 | Mounaouar et al. | |
| 2014/0122771 A1* | 5/2014 | Chrysos | G06F 13/36 |
| | | | 710/317 |
| 2014/0133307 A1* | 5/2014 | Yoshida | H04L 12/403 |
| | | | 370/235 |
| 2014/0233399 A1 | 8/2014 | Mann et al. | |
| 2014/0307736 A1 | 10/2014 | Krishnan et al. | |
| 2014/0325649 A1 | 10/2014 | Zhang | |
| 2015/0016255 A1 | 1/2015 | Bisht et al. | |
| 2015/0000490 A1 | 2/2015 | Ehara | |
| 2015/0200860 A1* | 7/2015 | Kampeas | H04L 43/08 |
| | | | 370/235 |
| 2015/0341267 A1 | 11/2015 | Chiba et al. | |
| 2016/0065484 A1* | 3/2016 | Suzuki | H04L 47/522 |
| | | | 370/415 |
| 2016/0092108 A1* | 3/2016 | Karaje | G06F 3/061 |
| | | | 718/103 |
| 2016/0127267 A1* | 5/2016 | Kumar | H04L 49/252 |
| | | | 370/400 |
| 2016/0344636 A1* | 11/2016 | Elias | H04L 47/2441 |
| 2017/0063660 A1 | 3/2017 | Viquez et al. | |
| 2017/0118041 A1 | 4/2017 | Bhattacharya et al. | |
| 2017/0149877 A1* | 5/2017 | Kabbani | H04L 67/1023 |
| 2017/0195254 A1 | 7/2017 | Pham et al. | |
| 2017/0195292 A1 | 7/2017 | Pham et al. | |
| 2017/0201469 A1* | 7/2017 | Elias | H04L 43/0817 |
| 2017/0264571 A1* | 9/2017 | Aibester | H04L 49/9005 |
| 2017/0331725 A1 | 11/2017 | Resenberry et al. | |
| 2017/0337010 A1* | 11/2017 | Kriss | G06F 3/061 |
| 2018/0006921 A1* | 1/2018 | Mozes | H04L 69/22 |
| 2018/0102937 A1 | 4/2018 | Casado et al. | |
| 2018/0123983 A1* | 5/2018 | Gunner | H04L 49/90 |

OTHER PUBLICATIONS

Mozes et al., U.S. Appl. No. 15/492,003 dated Apr. 20, 2017.

Lee et al., "Approximating Age-Based Arbitration in On-Chip Networks", Proceedings of the 19th international conference on parallel architectures and compilation techniques, Vienna, Austria, pp. ,575-576, Sep. 11-15, 2010.

802.1Qaz-2011—IEEE Standard for Local and metropolitan area networks, "Media Access Control (MAC) Bridges and Virtual Bridged Local Area Networks", Amendment 18: Enhanced Transmission Selection for Bandwidth Sharing Between Traffic Classes, IEEE Computer Society, 110 pages, Sep. 30, 2011.

Durand et al., "Loglog Counting of Large Cardinalities", Algorithms Project, INRIA—Rocquencourt, F78153 Le Chesnay (France), LNCS 2832, pp. 605-617, ESA 2003.

* cited by examiner

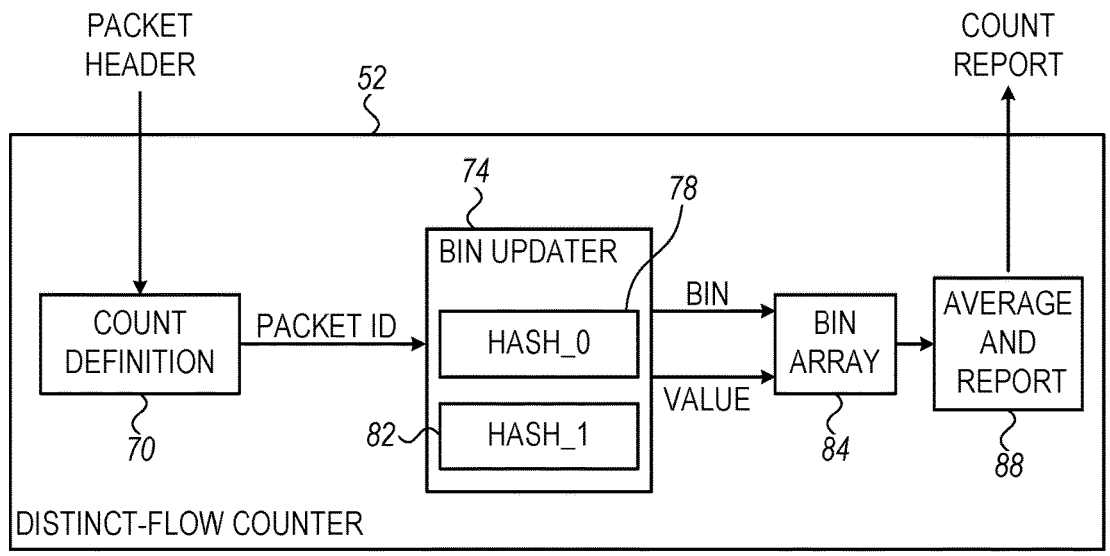
FIG. 3
FIG. 4
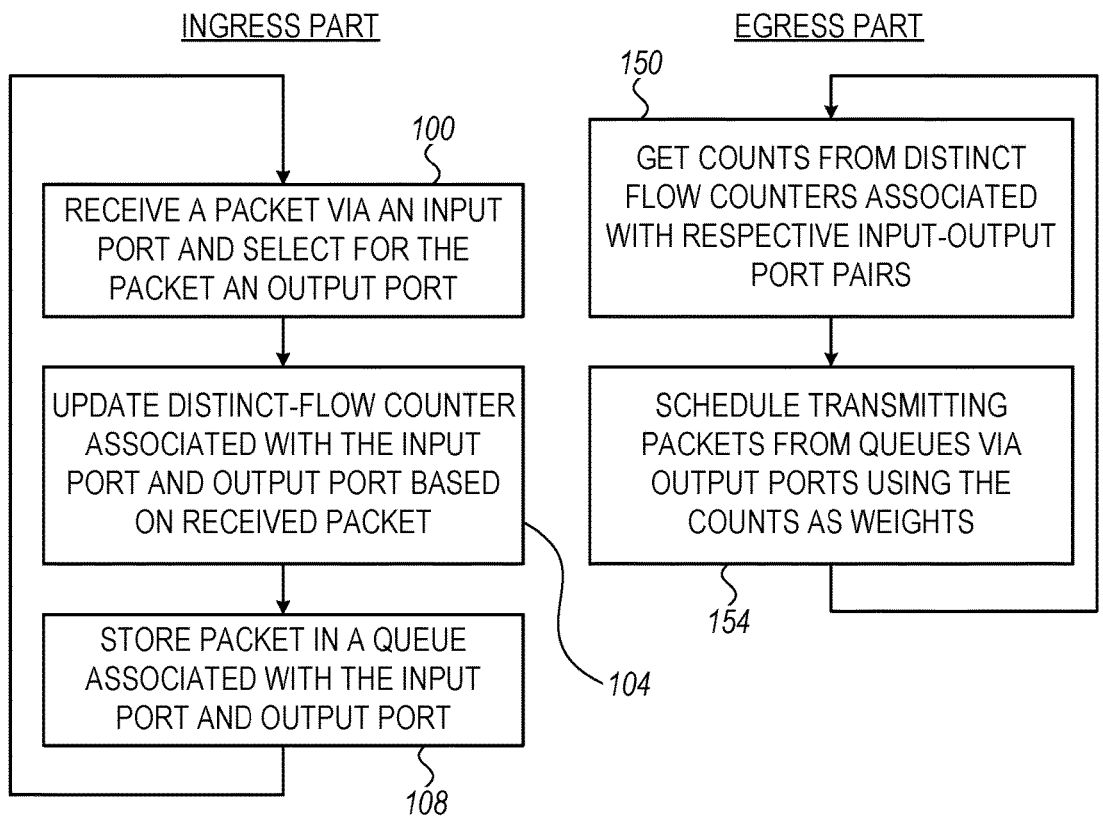

SWITCH ARBITRATION BASED ON DISTINCT-FLOW COUNTS

TECHNICAL FIELD

Embodiments described herein relate generally to communication systems, and particularly to methods and systems for arbitration in network elements based on distinct-flow counts.

BACKGROUND

A network element such as a switch typically transmits packets to the network, in accordance with some scheduling policy. Methods for scheduling the transmission of outgoing packets are known in the art. For example, U.S. Pat. No. 7,023,866, whose disclosure is incorporated herein by reference, describes a method for fair queue servicing at a queueing point in a multi-service class packet switched network. Incoming packets are received in buffers and outgoing packets are scheduled by a weighted fair queue scheduler. Real-time information of buffer usage along with the minimum bandwidth requirement is used to dynamically modify the weights of the weighted fair queue scheduler.

A paper titled "Approximating Age-Based Arbitration in On-Chip Networks," Proceedings of the 19th international conference on parallel architectures and compilation techniques, Sep. 11-15, 2010, Vienna, Austria, which is incorporated herein by reference, describes an on-chip network of emerging many-core CMPs that enables the sharing of numerous on-chip components. The network provides Equality of Service (EoS) by leveraging distance, or hop count, to approximate the age of packets in the network. Probabilistic arbitration is combined with distance-based weights to achieve EoS.

A converged network typically delivers traffic of different types that may require different delivery policies, such as avoiding packet loss or minimal latency. The Enhanced Transmission Selection (ETS) standard, which describes allocating bandwidth among multiple traffic classes, is specified, for example, in "802.1Qaz-2011—IEEE Standard for Local and metropolitan area networks—Media Access Control (MAC) Bridges and Virtual Bridged Local Area Networks—Amendment 18: Enhanced Transmission Selection for Bandwidth Sharing Between Traffic Classes," which is incorporated herein by reference.

SUMMARY

An embodiment that is described herein provides a network switch that includes circuitry and multiple ports, including multiple input ports and at least one output port, configured to connect to a communication network. The circuitry includes multiple distinct-flow counters, which are each associated with a respective input port and with the output port, and which are configured to estimate respective distinct-flow counts of distinct data flows received via the respective input ports and destined to the output port. The circuitry is configured to store packets that are destined to the output port and were received via the multiple input ports in multiple queues, to determine a transmission schedule for the packets stored in the queues, based on the estimated distinct-flow counts, and to transmit the packets via the output port in accordance with the determined transmission schedule.

In some embodiments, the circuitry is configured to determine the transmission schedule by distributing a bandwidth available for the output port among the multiple queues, so that a bandwidth-portion allocated for a given queue that queues packets received via one or more input ports is dependent on the distinct-flow counts associated respectively with the one or more input ports. In other embodiments, the circuitry is configured to receive from a distinct-flow counter multiple distinct-flow counts that were estimated over different respective time periods, to calculate a filtered count from the multiple distinct-flow counts, and to determine the transmission schedule based on the filtered count.

In an embodiment, each distinct-flow counter includes a count state and is configured to receive a count definition specifying one or more packet-header fields, and to update the count state upon accepting a packet, based on the accepted packet and the respective count definition. In another embodiment, the count state includes multiple bins, and the distinct-flow counter is configured to update values of the bins on a packet-by-packet basis, and to estimate the number of distinct data flows by averaging over the values of the multiple bins. In yet another embodiment, the distinct-flow counter is configured to apply a hash function to one or more fields in a header of the packet in accordance with the count definition, and to update the count state based on an outcome of the hash function. In yet further another embodiment, the distinct-flow counter is configured to calculate a combined value that combines a value that updates cyclically, with the one or more fields of the packet header, and to apply the hash function to the combined value.

In some embodiments, the circuitry is configured to define a minimal weight value, and to determine the transmission schedule based on a weight value selected as larger between the weights calculated form respective distinct-flow counts and the defined minimal weight value. In other embodiments, the packets received via the input ports are assigned multiple respective Service Level (SL) values, and the circuitry is configured to store packets that are assigned different SLs in different respective SL-specific queues, and to determine the transmission schedule separately for groups of SL-specific queues sharing a same SL. In yet other embodiments, the circuitry is configured to calculate arbitration weights based on the distinct-flow counts, and to distribute a bandwidth of the output port among the multiple queues in accordance with Enhanced Transmission Selection (ETS) specifications, so that the bandwidth is allocated based on the arbitration weights.

There is additionally provided, in accordance with an embodiment that is described herein, a method, including, in a network switch that includes multiple ports for connecting to a communication network, including multiple input ports and at least one output port, and that further includes multiple distinct-flow counters that each is associated with a respective input port and with the output port, and which estimate respective distinct-flow counts of distinct data flows received via the respective input ports and destined to the output port, storing packets that are destined to the output port and were received via the multiple input ports in multiple queues. A transmission schedule is determined for the packets stored in the queues, based on the estimated distinct-flow counts. The packets are transmitted via the output port in accordance with the determined transmission schedule.

These and other embodiments will be more fully understood from the following detailed description of the embodiments thereof, taken together with the drawings in which:

BRIEF DESCRIPTION OF THE DRAWINGS

FIG. 3 is a block diagram that schematically illustrates a distinct-flow counter, in accordance with an embodiment that is described herein; and FIG. 4 is a flow chart that schematically illustrates a method for queueing packets and applying an arbitration policy that is based on distinct-flow counts, in accordance with an embodiment that is described herein.

DETAILED DESCRIPTION OF EMBODIMENTS

Overview

Figure 1:
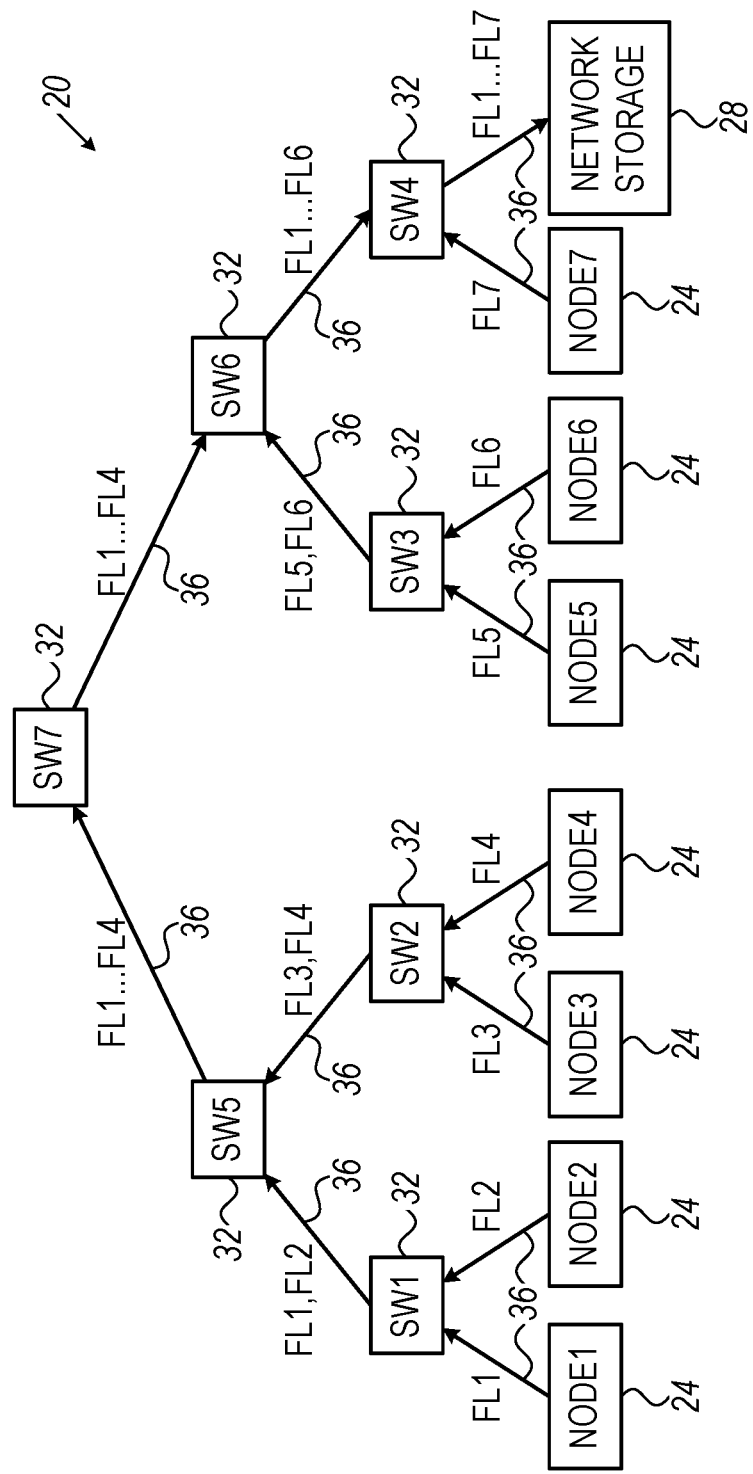
FIG. 1 is a block diagram that schematically illustrates a computing system having a shared resource, in accordance with an embodiment that is described herein.

A computing system such as a data center typically comprises multiple compute nodes (e.g., servers) that communicate with one another over a communication network. The communication network comprises multiple interconnected network elements such as switches or routers. A switch typically routes packets received from the network via input ports in accordance with a preconfigured routing plan, and transmits the routed packets to the network via output ports. The switch typically stores packets pending for transmission in multiple buffers or queues.

Embodiments that are described herein provide improved methods and systems for scheduling the transmission of packets in a network switch. In particular, the disclosed techniques are designed to allocate bandwidth fairly among multiple data flows, as will be described below.

In various applications, a large number of compute nodes require access to a common resource concurrently. For example, multiple compute nodes may share a common network resource such as a network storage. As another example, multiple compute nodes may concurrently send results of a distributed task to a central server over the communication network.

In such scenarios, in which multiple sources inject packets into the network toward a common destination in parallel, the packets may aggregate within switches along the route, and as a result, a given switch may receive packets from a different number of sources via different respective input ports. In principle, the switch may schedule the transmission of these packets via the output port by distributing the available bandwidth equally among the relevant input ports. This policy, however, results in unfair bandwidth allocation among data flows, as will be described below.

In the context of the present patent application and in the claims, the term "data flow" refers to a sequence of packets that are sent from a specific source to a specific destination over the communication network. A data flow may be specified, for example, by a certain "tuple" of field values in the packet headers, such as source and destination addresses.

Consider, for example, a switch receiving packets from a large number of sources via one port, and from only a single source via another port. Using equal arbitration weights, the switch would share half of the bandwidth among the multiple sources received via the one port, and half of the bandwidth to the single source received via the other port. When using such equal-weight arbitration across the network, compute nodes connected to the network far from the common resource would typically get a smaller portion of the bandwidth compared to compute nodes connected closer to the common resource. Such unfair bandwidth allocation may cause undesirable behavior in the network such as congestion and packet dropping.

In some embodiments described herein, the switch assigns the input ports arbitration weights that are proportional to the number of distinct data flows received via the input ports over a period of time. This arbitration scheme results in fair bandwidth allocation among the data flows, regardless of how the data flows are distributed across the input ports. Moreover, in some embodiments the switch occasionally adjusts the arbitration weights to accommodate time-varying traffic.

The arbiter described above assigns weights that depend linearly on the number of distinct flows. In other embodiments, the arbiter determines the weights using any suitable function whose input comprises the distinct-flow counts and one or more additional parameters such as the original ingress port, packet priority, queue priority, queue identity and the like.

In some embodiments, the switch stores packets that are destined to a given output port and that were received via multiple input ports in multiple queues. The switch comprises multiple distinct-flow counters that each estimates the count of distinct data flows received via a respective input port and destined to the given output port. The switch schedules the transmission of the packets stored in the queues via the given output port, based on the estimated distinct-flow counts. In an embodiment, the switch distributes the bandwidth available for the given output port among the multiple queues, so that a portion of the available bandwidth for a given queue that queues packets received via one or more input ports is dependent on the distinct-flow counts associated respectively with the one or more input ports.

Counting the exact number of distinct flows typically requires maintaining, in the switch, a state per distinct flow. This solution, although applicable to small-sized networks, may be expensive or otherwise infeasible in switches operating in a high-traffic network or when the expected number of distinct flows is very large.

In some disclosed techniques, instead of exact counting, the switch estimates the number of distinct flows efficiently using low-footprint hardware. In some embodiments, the distinct-flow counter comprises a multi-bin array that updates on a packet-by-packet basis. The distinct-flow counter estimates the number of the distinct flows, e.g., cyclically or on demand, by averaging the bin values in the array.

In some embodiments, the count accuracy depends on the number of bins in the bin-array. For example, a 32-bin array is typically sufficient for achieving a count accuracy of less than 20%. In some embodiments, to improve the estimation accuracy, and therefore also the stability of the bandwidth allocation, the switch applies low-pass filtering to multiple counts estimated by each distinct-flow counter over multiple time periods to produce smoothed counts and performs the bandwidth allocation based on the smoothed counts.

In some embodiments, the packets received via the input ports are assigned multiple respective Service Level (SL) values. The switch stores packets that are assigned different SLs in different respective SL-specific queues, and schedules the transmission of the packets separately for groups of SL-specific queues sharing the same SL.

System Description

FIG. 1 is a block diagram that schematically illustrates a computing system 20 having a shared resource, in accordance with an embodiment that is described herein. Computing system 20 comprises multiple compute nodes 24 denoted NODE1 . . . NODE7 and a network storage 28, which connect to a communication network comprising network switches 32 denoted SW1 . . . SW7. In practical implementations, however, computing system 20 and the communication network may comprise hundreds or even thousands of network nodes and switches. Network switch 32 is also referred to simply as "switch" for brevity. Switches 32, compute nodes 24 and network storage 28 interconnect via links 36. Typically, each of compute nodes 24 and network storage 28 comprises a Network Interface Controller (NIC) (not shown) for connecting to a switch in the communication network.

Computing system 20 can be used in various applications such as, for example, data centers, High Performance Computing (HPC) systems, distributed computing systems, or any other application in which compute nodes communicate with one another and with shared network resources over a communication network.

The communication network in computing system 20 may comprise a packet network of any suitable type, operating in accordance with any suitable standards and protocols. For example, the communication network may comprise an IP network, an Ethernet network or an InfiniBand (IB) switch fabric. Moreover, the communication network may combine multiple networks of different types.

In computing system 20, compute nodes 24 communicate with one other and with network storage 28 via suitable routes of switches and links. For example, NODE1 may communicate with NODE5 (and also with NODE6) via a route comprising switches SW1, SW5, SW7, SW6 and SW3. As another example, SW6 can access network storage 28 via SW3, SW6 and SW4.

Network storage 28 may comprise any suitable storage device or storage system such as, for example, a disk array of any suitable capacity, operating in accordance with any suitable protocol. Network storage 28 is used by all (or at least some) of compute nodes 24 and therefore considered a shared resource.

Although in the example of FIG. 1 the shared resource comprises a network storage, the disclosed techniques are applicable to any other suitable shared resource. For example, the shared resource may comprise a RAID reconstruction server that operates in accordance with the RAID-5 or RAID-6 protocol, and which recovers data failing in a given compute node by receiving simultaneously partial recovering data from a large number of compute nodes over the communication network.

FIG. 1 depicts a scenario in which NODE1 . . . NODE7 access network storage 28 simultaneously. Let FL1 . . . FL7 denote data flows originating in NODE1 . . . NODE7, respectively. As seen in FIG. 1, the switches aggregate traffic toward network storage 28. For example, SW5 transmits to SW7 four aggregated data flows FL1 . . . FL4, which are further aggregated in SW6 with FL5 and FL6. SW4 aggregates FL7 of NODE7 with FL1 . . . FL6 toward network storage 28.

In the present example, switch 32 has two input ports for receiving packets from the network, and one output port for transmitting packets to the network. Consider an arbitration policy in which switch 32 distributes the bandwidth available at the output port equally between the two input ports. In addition, we assume that all the data flows have the same delivery priority. In this case, SW4, for example, evenly allocates the available bandwidth to FL7 received via one port and to FL1 . . . FL6 received via the other port.

Therefore, each of data flows FL1 . . . FL6 gets only $\frac{1}{12}$ of the bandwidth, whereas FL7 gets $\frac{1}{2}$ of the total bandwidth.

In general, a compute node 24 connected to the network close to network storage 28 may get a higher bandwidth than a compute node that connects to the network far away from the network storage. Note that the unfairness among the data flows is caused by the network topology and the arbitration policy, even when all the data flows have the same priority.

In the disclosed embodiments, in order to allocate the bandwidth evenly among the data flows received, switch 32 evaluates a count of the distinct data flows received via each input port (and directed toward a given output port) and applies weighted arbitration that distributes the bandwidth at the output port proportionally to the evaluated counts. In the example of FIG. 1, by using the disclosed embodiments, SW4 would assign normalized weights of $\frac{1}{7}$ to FL7 and $\frac{6}{7}$ to FL1 . . . FL6 together, which results in fair bandwidth allocation among the data flows.

Figure 2:
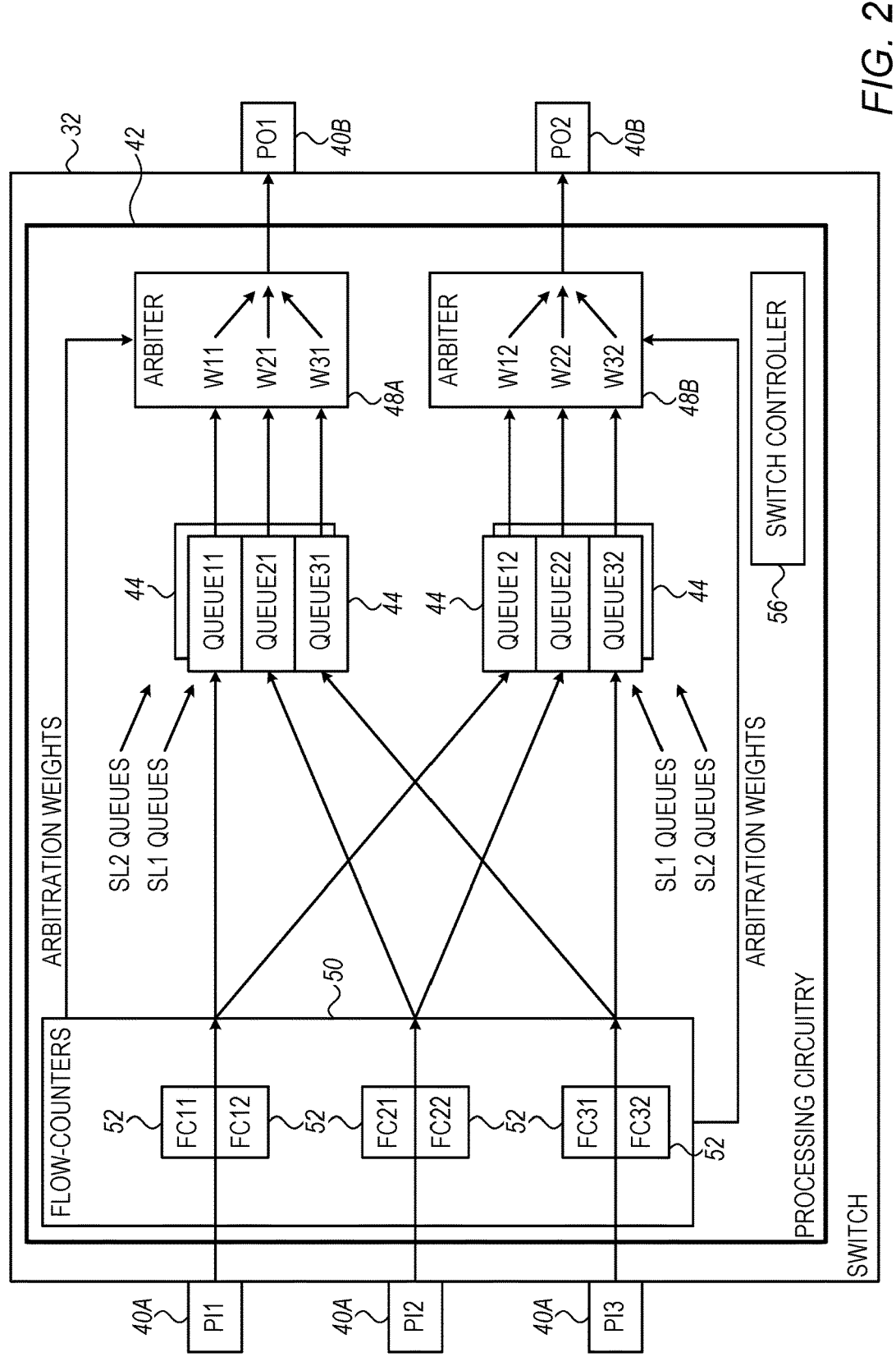
FIG. 2 is a block diagram of a network switch that applies arbitration based on distinct-flow counts, in accordance with an embodiment that is described herein.

FIG. 2 is a block diagram of network switch 32 that applies arbitration based on distinct-flow counts, in accordance with an embodiment that is described herein. Network switch 32 is also referred to simply as "switch," for brevity.

Switch 32 may serve as a building block in a packet network such as an IP network or an Ethernet network. In alternative embodiments, the disclosed techniques can be implemented in other kinds of network elements such as routers or bridges. The network element and communication network may operate in accordance with any other suitable communication standard or protocol, such as InfiniBand (IB) or Ethernet. In the present example, switch 32 is comprised within computing system 20 of FIG. 1.

Switch 32 comprises multiple ports 40 for connecting to other switches, compute nodes 24, network storage 28 or any other suitable element connected to the network. Switch 32 accepts communication packets from the communication network of computing system 20, e.g., from other switches, compute nodes 24 and/or network storage 28, via input ports 40A, and forwards each packet to a certain output port 40B en-route to its destination.

The port over which a given packet enters the switch is referred to as an input port or ingress port, and the port over which a given packet leaves the switch is referred to as an output port or egress port. In a typical switch implementation, however, a single port 40 may function both as an input port and as an output port. In the example of FIG. 2, switch 32 comprises three input ports denoted PI1, PI2 and PI3, and two output ports denoted PO1 and PO2.

In the example of FIG. 2, switch 32 comprises processing circuitry 42, which performs forwarding of packets between input ports 40A and output ports 40B. In some embodiments, the switch comprises a switch fabric (not shown) that holds a routing plan. The routing plan may be predefined or update adaptively, e.g., based on network conditions. The processing circuitry may route incoming packets, for example, by applying to the packets suitable routing rules, e.g., based on certain fields in the packet headers such as, for example, source and destination addresses, source and destination ports, underlying protocol and the like.

Switch 32 comprises multiple queues 44 for storing packets pending transmission. In an embodiment, the switch manages queues 44 in a shared buffer (not shown). In the example of FIG. 2, switch 32 comprises three queues per output port, i.e., a dedicated queue for each pair of output port and input port. The processing circuitry stores packets received via port PIi (i=1, 2, 3) and destined to output port POj (j=1, 2) in a respective queue QUEUEij. For example, output port PO1 is associated with queues denoted QUEUE11, QUEUE21 and QUEUE31 that in the present example store packets received via input ports PI1, PI2 and PI3, respectively.

In some embodiments, the communication network of computing system 20 supports multiple Service Levels (SLs). In such embodiments, each output port 40B has a dedicated queue 44 per input port and SL. In the present example, switch 32 supports two SLs denoted SL1 and SL2, and therefore the switch comprises six queues 44 per output port. The SL assigned to a packet is typically set in a header of the packet. The processing circuitry reads the value of the packet's SL from the header and stores the packet in a relevant queue 44.

SLs are typically used in InfiniBand for assigning classes of service to packets. Other networks may also support differential quality of service. In Ethernet networks, for example, traffic classification is used for categorizing network traffic into a number of traffic classes according to various parameters (for example, based on port number or protocol). The disclosed embodiments are applicable to SLs, as well as to any other suitable traffic classification technique.

Switch 32 comprises an arbiter 48 for each output port 40B. For a given output port, arbiter 48 transmits packets stored in the respective queues 44 in accordance with some scheduling or arbitration policy. In some embodiments, arbiter 48 distributes the available bandwidth among the queues associated with the output port in accordance with respective weights. In the disclosed embodiments, the processing circuitry determines the weights dynamically based on distinct-flow counts of the data flows received via the respective input ports, as will be described in detail below.

In some of the disclosed embodiments, arbiters 48 apply a weighted arbitration policy. Each arbiter 48 holds multiple weights $W_{ij}$, i=1 . . . 3, j=1, 2, i.e., a dedicated weight for each pair of input port and output port. The weights $W_{ij}$ may have non-negative integer or non-integer values. Arbiter 48A of port PO1 is configured with weights W11, W21 and W31 for input ports PI1, PI2 and PI3, respectively. For example, denoting WS1=(W11+W21+W31), arbiter 48A may allocate the bandwidth in accordance with the ratios W11/WS1, W21/WS1 and W31/WS2. Similarly, arbiter 48B of PO2 is configured with weights denoted W12, W22 and W32 and distributes the bandwidth among the input ports (or queues) in accordance with the ratios W12/WS2, W22/WS2 and W32/WS2, wherein WS2=W12+W22+W32.

In embodiments in which the packets belong to data flows of multiple SLs, arbiters 48 apply the described weighted arbitration per SL separately, and schedules the transmission based on the SL values. In the example of FIG. 1, each arbiter 48 is associated with two groups of SL-specific queues, wherein each group comprises three queues and is associated with a different SL value. In one embodiment, arbiter 48 first selects a group of queues based on the SL values, and then arbiter 48 applies weighted arbitration among the queues in the selected group. Alternatively, arbiter 48 first selects a queue in each of the groups using weighted arbitration, and then applies arbitration among these queues based on their respective SL values. The arbitration among the different SLs can be carried out within arbiter 48 or by an additional element of the switch external to arbiter (not shown in the figure).

Arbiter 48 can perform any suitable weighted arbitration method for selecting a queue in a group, such as, for example, weighted round-robin arbitration or strict-priority arbitration.

In some embodiments, arbiter 48 operates in accordance with the ETS specifications cited above. In such embodiments, the arbiter may apply ETS-based arbitration for arbitrating among the different SLs, for arbitrating among queues sharing the same SL, or both. In embodiments in which the arbitration among queues having a common SL is based on the ETS specifications, the arbiter modifies the ETS weights that are used for bandwidth allocation, based at least on the distinct-flow counts as described above. In some embodiments, the arbiter modifies the ETS weights based on one or more parameters such as: distinct-flow counts, original ingress port, packet priority, queue priority, queue identity, and the like.

Processing circuitry 42 comprises a flow-counters module 50, which comprises multiple distinct-flow counters 52. A distinct-flow counter 52 denoted $FC_{ij}$ is configured to estimate the number of distinct data flows received via PIi and destined to POj. In the present example, each of the input ports is assigned a distinct-flow counter per output port.

In some embodiments, determining the weights by arbiters 48 is based on the estimated counts of the distinct flows. For example, the arbiter determines the weights $W_{ij}$ proportionally to the respective counts estimated by distinct-flow counters $FC_{ij}$. A large count value corresponds to a large weight value, and therefore to a large portion of the bandwidth, and vice versa.

In some embodiments, distinct-flow counter 52 updates on a packet-by-packet basis. The count is updated for a received packet based on hashing certain fields in the packet's header, such as (but not limited to) source and destination addresses. The packet header fields to be used for counting are configured beforehand as a count definition within the distinct-flow counter. A detailed block diagram of distinct-flow counter 52 is described further below.

Switch 32 comprises a switch controller 56, which performs the various management functions of switch 32. For example, switch controller 56 configures the desired routing plan of the switch. By controlling the routing plan, switch 32 is able to cause the packets to traverse various routing paths through the network. In some embodiments, switch controller 56 also configures distinct-flow counters 52 with count definitions, i.e., the packet header fields to be used for counting, as will be described below.

To accommodate time-changing traffic, the processing circuitry updates the arbitration weights $W_{ij}$ by cyclically restarting the distinct-flow counters, allowing the counter's states to update by incoming packets and re-reading updated count estimates. The period between consecutive restarting events is implementation-dependent and may vary, for example, between 10 microseconds and 0.5 second. In an embodiment, restarting a distinct-flow counter is carried out by zeroing the bin values in the counter bin-array.

In some embodiments, arbiter 48 assigns a minimal weight to be used for each pair of input and output ports. In such embodiments, when traffic related to this pair stops, the arbiter will get this non-zero minimal weight so that when the traffic resumes, the minimal weight will be used until the relevant distinct-flow counter provides reliable counts. This approach prevents using zero weights when traffic resumes but the distinct-flow count is still unreliable. The minimal weight can be specified as a percentage (e.g., 1%) of the available bandwidth or as a minimal number of data flows (e.g., 5 data flows).

In some embodiments, the processing circuitry supports freezing the states of the distinct-flow counters, and reporting a snapshot of recent count estimates to the user. In an embodiment, freezing and resuming the distinct-flow counters is carried out using dedicated control packets.

In some embodiments, a single queue receives packets from multiple input ports that are directed to a common output port. For example, in FIG. 2, QUEUE11 may receive packets from both PI1 and PI2 (not shown in the figure). In such embodiments, arbiter 48 assigns a weight for this queue based on the distinct-flow counts related to the respective multiple input ports and to the associated output port. For example, the arbiter may assign a weight proportionally to the sum of the relevant distinct-flow counts.

Distinct-Flow Counter Implementation

FIG. 3 is a block diagram that schematically illustrates distinct-flow counter 52, in accordance with an embodiment that is described herein. In some embodiments, the distinct-flow counter is implemented in hardware for handling large amounts of traffic. In an example embodiment, distinct-flow counters 52 can be implemented as described in the paper "HyperLogLog: the analysis of a near-optimal cardinality estimation algorithm," the 2007 Conference on Analysis of Algorithms (AofA'07), Juan des Pins, France, Jun. 17-22, 2007, which is incorporated herein by reference. Alternatively, other suitable variants of the LogLog approach can also be used. Further alternatively, any other suitable type of distinct-value estimation scheme can be used for implementing the distinct-flow counters, including, for example, the Hashset and Linear probabilistic methods.

In some embodiments, to support estimating up to a number Nmax of distinct flows, the distinct-flow counter is required to have a local memory whose size is proportional to Log[Log(Nmax)].

In some embodiments, distinct-flow counter 52 receives a stream of packets, i.e., via a respective input port, and a count definition 70 from the switch controller. The count definition specifies one or more fields in the packets headers over which to count distinct values. For each packet accepted, the distinct-flow counter calculates a packet identification value (packet ID) based on the count definition. For example, the packet ID may comprise the values in the packet header fields specified by the count definition, or a result of some function applied to these values.

Distinct-flow counter 52 further comprises a bin updater 74, which is configured to update a count state of the distinct flow counter, implemented as a bin array 84, on a packet-by-packet basis. Bin array 84 comprises a predefined number M of bins, wherein each bin comprises B bits. Depending on the application, the number of bins M may be in the range 2 . . . 1024, and the number of bits per bin B in the range 4 . . . 8, although other values are also possible.

Bin updater 74 comprises a hash function 78 denoted HASH_0, and a hash function 82 denoted HASH_1. The bin updater applies HASH_0 and HASH_1 to the packet ID to produce a bin index (denoted BIN in the figure) in the range 0 . . . M−1, and a bin value (denoted VALUE in the figure) in the range 0 . . . $2^B$−1, respectively. Distinct-flow counter 52 updates bin array 84 by storing the B-bit value calculated by HASH_1 in the bin indexed by the index outcome of HASH_0. Example hash functions that can be used for implementing HASH_0 and HASH_1 include the Fowler-Noll-Vo (FNV) hash function, the Toeplitz hash function, and a Cyclic Redundancy Check (CRC) hash function.

The hash function HASH_0 is typically designed to distribute its input uniformly over the M bins.

The bin updater may calculate the bin index (BIN) using the following expression:

BIN=HASH_0(Packet ID)    Equation 1:

The bin updater may further calculate the bin value (VALUE) using any suitable method, such as, for example, by calculating the expression:

VALUE=(VALUE)OR[HASH_1(Packet ID)]    Equation 2:

wherein in Equation 2, the operator OR denotes a logical bitwise OR operation. In this case HASH_1 outputs random (or pseudo-random) B-bit values in the range 0 . . . $2^B$−1. Alternatively, the bin updater may calculate the bin value using the expression:

VALUE=max{VALUE,FirstSetID[HASH_1(Packet ID)]}    Equation 3:

wherein the operator max{x,y} selects x if x>y, and y otherwise. The operator FirstSetID[w] outputs the position of the first nonzero bit in w starting the count from the Least Significant Bit (LSB), which is the leftmost bit in this example. For example, for w=0001 . . . , FirstSetID[w]=4. In Equation 3, HASH_1 outputs random numbers of B bits. The FirstSetID operator outputs values having $\text{Log}_2$ (B) bits.

Note that the distinct-flow counter updates bin array 84 per each packet accepted and does not need to store a dedicated state per each distinct flow. Therefore, the distinct-flow counter requires only a small storage space for the count state, e.g., on the order of a few Kbytes to support estimating up to a number of $10^9$ or more distinct flows with high precision.

Distinct-flow counter 52 comprises an average and report module 88 that estimates the number of distinct flows based on the values accumulated in the bin array. In an embodiment, the distinct-flow counter estimates the number of distinct flows (denoted Z) by averaging the values VAULE (m) m=0 . . . M−1 in bin array 84, as given by:

Z=Const(M)·Average$_m$[VALUE(m)]    Equation 4:

Average and report module 88 may apply any suitable type of averaging operation, such as, for example, a harmonic average operation is given by:

$$\text{Average}_m[\text{VALUE}(m)] = \frac{1}{\sum_{m=0}^{M-1} [2^{-VALUE(m)}]}$$    Equation 5

In Equation 4, Const(M) is a constant value that depends on the number of bins M, and compensates for estimation bias. The value of Const(M) additionally depends on the expression used for calculating VALUE as given in Equations 2 and 3 above.

In some embodiments, bin updater 74 comprises a single hash function (denoted HASH). In such embodiments, and assuming M=$2^k$ for some integer k, bin updater 74 calculates a binary variable X=HASH(PacketID), and splits the bits of X between the bin-index BIN and the bin-value VALUE. For example, the part of X represented by the first k bits serves as BIN, and the part of X that remains after discarding the first k bits serves as VALUE.

In some embodiments, calculating Z in Equation 4 is based on calculating an arithmetic average of VALUE(m). In this case the average calculation is given by:

$$\text{Average}_m[\text{VALUE}(m)] = 2^{\frac{1}{M}\sum_{m=0}^{M-1} VALUE(m)}$$    Equation 6

Scheduling the calculation of the number of distinct flows, e.g., as given in Equation 4 (or Equation 6), can be carried out in various ways. In an example embodiment, average and report module 88 calculates Equation 4 cyclically, e.g., periodically at predefined intervals. Alternatively or additionally, average and report module calculates Equation 4 upon explicit request, e.g., from the switch controller. Average and report module 88 may report the evaluated number of distinct flows per each calculation of the average as in Equation 4.

Reporting the number of distinct flows may be synchronized or unsynchronized to the time of calculating this number, e.g., using Equation 4. For example, reporting the number of distinct flows can be carried out once per several evaluations of Equation 4, or upon an explicit request. In some embodiments, average and report module 88 reports only the estimated number of distinct flows. Alternatively or additionally, average and report module 88 reports the estimated number of distinct flows when this number exceeds a predefined threshold number.

The estimation accuracy in various variants of the LogLog count approach is proportional to $1/\sqrt{M}$, e.g., for M=32 the estimation accuracy would be about 18%. In some embodiments, such accuracy is insufficient for stable arbitration, and the processing applies a smoothing function (e.g., a low pass filter) to multiple count estimates provided by the distinct-flow counter. In an example embodiment, the processing circuitry calculates a smoothed weight (or count) by averaging the smoothed weight with an updated count estimate using the expression:

$$\text{Smoothed Weight} = (\text{Smoothed Weight} + \text{Estimated Count})/2 \quad \text{Equation 7:}$$

In some embodiments, bin updater 74 applies the hash function (HASH_0, HASH_1 or both) to a variable that combines PacketID of count definition 70 with a salt value (not shown). For example, the input to the hash function may comprise a variable that concatenates PacketID and the salt value. In some embodiments, the salt value updates cyclically, e.g., incremented by 1 or by any other suitable value, or determined randomly. Alternatively, other suitable salting techniques can also be used. In general, the purpose of combining a salt value within the input provided to the hash function is to improve the randomness among the outcome values of the hash function.

The configuration of computing system 20, switch 32 and distinct-flow counter 52 shown in FIGS. 1-3 are example configurations, which are chosen purely for the sake of conceptual clarity. In alternative embodiments, any other suitable computing system, switch and distinct-flow counter configurations can be used. Some elements of switch 32, such as distinct-flow counters 52, may be implemented in hardware, e.g., in one or more Application-Specific Integrated Circuits (ASICs) or Field-Programmable Gate Arrays (FPGAs). Additionally or alternatively, some switch elements can be implemented using software, or using a combination of hardware and software elements.

In some embodiments, some of the functions of processing circuitry 42 may be carried out by a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

In the context of the present patent application, the term "processing circuitry 42" refers to all the elements of switch 32 excluding ports 40. In FIG. 2, the processing circuitry comprises flow-counters module 50, queues 44, arbiters 48 and switch controller 56. The processing circuitry is also referred to simply as "circuitry," for brevity.

A Method for Queuing and Arbitration in a Switch

FIG. 4 is a flow chart that schematically illustrates a method for queueing packets and applying arbitration policy that is based on distinct-flow counts, in accordance with an embodiment that is described herein. The method can be carried out, for example, by processing circuitry 42 of switch 32.

In describing the method, we assume that the switch has a preconfigured routing plan between its input and output ports. We additionally assume that the distinct-flow counters are preconfigured with desired count definitions.

The method of FIG. 4 has an ingress part that handles packet queueing and counting, and an egress part that handles switch arbitration. The processing circuitry typically executes the ingress and egress parts in parallel.

The ingress part of the method begins with processing circuitry 42 receiving a packet from the network via an input port, at a reception step 100. Based on the preconfigured routing plan, the processing circuitry determines for the received packet a respective output port.

At a count updating step 104, the processing circuitry updates the distinct-flow counter associated with the pair on input port and output port, based on the received packet, as described above.

At a queueing step 108, the processing circuitry stores the packet in a queue associated with the input port, output port (and when applicable also with SL assigned to the packet). Alternatively, other suitable schemes for selecting queues for incoming packets can also be used. The processing circuitry then loops back to step 100 to receive a subsequent packet.

The egress part of the method begins, at a count-reading step 150, with the processing circuitry reading updated count estimates from the distinct-flow counters associated with each pair of input and output ports, to be used for arbitration weights. For example, with reference to FIG. 2, the processing circuitry reads FC11, FC21 and FC31 for determining the respective weights W11, W21 and W31 in arbiter 48A of output port PO1. In some embodiments, the processing circuitry determines the weights proportionally to the respective count estimates.

At a transmission step 154, the processing circuitry schedules the transmission of packets from the queues via the output ports, by distributing the available bandwidth of each output port among the respective queues based on the weights. The processing circuitry then loops back to step 150 to read updated count estimates.

The embodiments described above are given by way of example, and other suitable embodiments can also be used. For example, although in the described embodiments we refer mainly to statistical estimation of the number of distinct flows, in alternative embodiments, exact counts can be used instead.

In the embodiments described above, the switch typically selects a queue for an incoming packet based on the relevant ingress port and/or SL. This scheme for distributing packets among queues is not mandatory, and any other suitable scheme can also be used. For example, in selecting a queue for a packet, the switch may consider various factors such as having queues that receive packets from multiple ingress ports, queues that receive packets of multiple different SLs, certain priority fields in the packet header and the like.

Although the disclosed embodiments mainly refer to bandwidth allocation in a network element (e.g., a switch) of a packet communication network, the embodiments are similarly applicable across multiple networks, e.g., in cases in which nodes in multiple data centers attempt to access simultaneously one or more resources in another data center that is possibly located in another country.

Although the embodiments described herein mainly address fair arbitration in packet communication networks, the methods and systems described herein can also be used in other applications, such as in a Network on Chip (Noc) in which a large number of processing cores are interconnected within an integrated circuit.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network switch, comprising:
multiple ports, including multiple input ports and at least one output port, configured to connect to a communication network; and
circuitry comprising multiple hardware-implemented distinct-flow counters, wherein each distinct-flow counter is associated with a respective input port and with the output port, and is configured to estimate, based on packets received via the respective input port, a respective distinct-flow count, comprising a number of different data flows received via the respective input port and destined to the output port;
wherein the circuitry is configured to:
store packets that are destined to the output port and were received via the multiple input ports in multiple queues;
read count values from the distinct-flow counters that are associated with the respective input ports and with the output port;
determine for the packets stored in the queues a transmission schedule that distributes a bandwidth available at the output port among the queues, by allocating a portion of the bandwidth available at the output port, for a given queue that queues packets received via one or more input ports, based on the read count values that are associated respectively with the one or more input ports, such that each input port is allocated a bandwidth-portion that grows with the number of distinct flows received via that input port; and
transmit the packets via the output port in accordance with the determined transmission schedule.

2. The network switch according to claim 1, wherein the circuitry is configured to read from a distinct-flow counter multiple distinct-flow counts that were estimated over different respective time periods, to calculate a filtered count from the multiple distinct-flow counts, and to determine the transmission schedule based on the filtered count.

3. The network switch according to claim 1, wherein each distinct-flow counter comprises a count state and is configured to receive a count definition specifying one or more packet-header fields, and to update the count state upon accepting a packet, based on the accepted packet and the respective count definition.

4. The network switch according to claim 3, wherein the count state comprises multiple bins, wherein the distinct-flow counter is configured to update values of the bins on a packet-by-packet basis, and to estimate the number of different data flows by averaging over the values of the multiple bins.

5. The network switch according to claim 3, wherein the distinct-flow counter is configured to apply a hash function to one or more fields in a header of the packet in accordance with the count definition, and to update the count state based on an outcome of the hash function.

6. The network switch according to claim 5, wherein the distinct-flow counter is configured to calculate a combined value that combines a value that updates cyclically, with the one or more fields of the packet header, and to apply the hash function to the combined value.

7. The network switch according to claim 1, wherein the circuitry is configured to define a minimal weight value, and to determine the transmission schedule based on a weight value selected as larger between the weights calculated from respective distinct-flow counts and the defined minimal weight value.

8. The network switch according to claim 1, wherein the packets received via the input ports are assigned multiple respective Service Level (SL) values, wherein the circuitry is configured to store packets that are assigned different SLs in different respective SL-specific queues, and to determine the transmission schedule separately for groups of SL-specific queues sharing a same SL.

9. The network switch according to claim 1, wherein the circuitry is configured to calculate arbitration weights based on respective distinct-flow counts, and to distribute a bandwidth of the output port among the multiple queues in accordance with Enhanced Transmission Selection (ETS) specifications, so that the bandwidth is allocated based on the arbitration weights.

10. A method, comprising:
in a network switch that comprises multiple ports for connecting to a communication network, including multiple input ports and at least one output port, and that further comprises multiple hardware-implemented distinct-flow counters, wherein each distinct-flow counter is associated with a respective input port and with the output port, and estimates, based on packets received via the respective input port, a respective distinct-flow count, comprising a number of different data flows received via the respective input port and destined to the output port, storing packets that are destined to the output port and were received via the multiple input ports in multiple queues;
reading count values from the distinct-flow counters that are associated with the respective input ports and with the output port;
determining for the packets stored in the queues a transmission schedule that distributes a bandwidth available at the output port among the queues, by allocating a portion of the bandwidth available at the output port, for a given queue that queues packets received via one or more input ports, based on the read count values that are associated respectively with the one or more input ports, such that each input port is allocated a bandwidth-portion that grows with the number of distinct flows received via that input port; and transmitting the packets via the output port in accordance with the determined transmission schedule.

11. The method to claim 10, wherein determining the transmission schedule comprises reading from a distinct-flow counter multiple distinct-flow counts that were estimated over different respective time periods, calculating a filtered count from the multiple distinct-flow counts, and determining the transmission schedule based on the filtered count.

12. The method according to claim 10, wherein each distinct-flow counter comprises a count state, and comprising, receiving a count definition specifying one or more packet-header fields, and updating the count state upon accepting a packet, based on the accepted packet and the respective count definition.

13. The method according to claim 12, wherein the count state comprises multiple bins, wherein updating the count state comprises updating values of the bins on a packet-by-packet basis, and wherein determining the transmission schedule comprises estimating the number of different data flows by averaging over the values of the multiple bins.

14. The method according to claim 12, wherein updating the count state comprises applying a hash function to one or more fields in a header of the packet in accordance with the count definition, and updating the count state based on an outcome of the hash function.

15. The method according to claim 14, and comprising calculating a combined value that combines a value that updates cyclically, with the one or more fields of the packet header, and applying the hash function to the combined value.

16. The method according to claim 10, and comprising defining a minimal weight value, and wherein determining the transmission schedule comprises determining the transmission schedule based on a weight value selected as larger between the weights calculated from respective distinct-flow counts and the defined minimal weight value.

17. The method according to claim 10, wherein the packets received via the input ports are assigned multiple respective Service Level (SL) values, wherein storing the packets comprises storing packets that are assigned different SLs in different respective SL-specific queues, and wherein determining the transmission schedule comprises determining the transmission schedule separately for groups of SL-specific queues sharing a same SL.

18. The method according to claim 10, and comprising calculating arbitration weights based on respective distinct-flow counts, and wherein determining the transmission schedule comprises distributing a bandwidth of the output port among the multiple queues in accordance with Enhanced Transmission Selection (ETS) specifications, so that the bandwidth is allocated based on the arbitration weights.

* * * * *